(12) United States Patent
Hatano et al.

(10) Patent No.: US 8,103,410 B2
(45) Date of Patent: Jan. 24, 2012

(54) STEERING GUIDE DEVICE AND STEERING GUIDE METHOD

(75) Inventors: Yoshikazu Hatano, Hiratsuka (JP); Keijiro Iwao, Yokohama (JP); Kenya Uenuma, Yokohama (JP); Katsunori Okada, Yokosuka (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 687 days.

(21) Appl. No.: 12/280,621

(22) PCT Filed: Mar. 14, 2007

(86) PCT No.: PCT/JP2007/055135
§ 371 (c)(1),
(2), (4) Date: Aug. 25, 2008

(87) PCT Pub. No.: WO2007/105772
PCT Pub. Date: Sep. 20, 2007

(65) Prior Publication Data
US 2009/0093930 A1    Apr. 9, 2009

(30) Foreign Application Priority Data
Mar. 15, 2006    (JP) .................................. 2006-070653

(51) Int. Cl.
*B60W 30/02* (2006.01)
*B62D 15/02* (2006.01)
*B60K 35/00* (2006.01)

(52) U.S. Cl. ............. 701/41; 701/42; 180/400; 340/438

(58) Field of Classification Search ............... 701/41, 701/1, 36, 42; 180/400; 73/1.08, 66; 702/127; 33/203.18; 356/155; 340/438
See application file for complete search history.

(56) References Cited

U.S. PATENT DOCUMENTS

| | | | | |
|---|---|---|---|---|
| 5,434,784 A | * | 7/1995 | Bradley et al. | 701/41 |
| 5,748,301 A | * | 5/1998 | Muller et al. | 356/155 |
| 7,142,100 B2 | * | 11/2006 | Brown et al. | 340/438 |
| 7,143,363 B1 | * | 11/2006 | Gaynor et al. | 715/771 |
| 7,681,322 B1 | * | 3/2010 | Pruitt et al. | 33/203.18 |
| 2006/0155441 A1 | * | 7/2006 | Berg et al. | 701/41 |

FOREIGN PATENT DOCUMENTS

| | | |
|---|---|---|
| JP | 64-049480 U | 3/1989 |
| JP | 01-187700 A | 7/1989 |
| JP | 08-178679 A | 7/1996 |
| JP | 11-192960 A | 7/1999 |
| JP | 2001-109999 A | 4/2001 |
| JP | 2005-075187 A | 3/2005 |

OTHER PUBLICATIONS

Japanese Office Action and English Translation, dated Oct. 4, 2011, 5 pages.

* cited by examiner

*Primary Examiner* — Tan Q Nguyen
(74) *Attorney, Agent, or Firm* — Foley & Lardner LLP

(57) ABSTRACT

A steering detecting section (11) detects steering angle in the steering operation of a vehicle driver performed for a steering (10) and a control section (12) controls rotational movement of a visual information display (13) based on the detected steering angle. A rotational angle is set while the value for steering angle in the right direction being differentiated from the value for steering angle in the left direction with regard to the same steering angle in the right and left different directions, thus guiding the vehicle driver to correct the difference between the right and left steering speeds in the steering operation.

12 Claims, 16 Drawing Sheets

STEERING HOLD TIME

FIG. 7
(a)
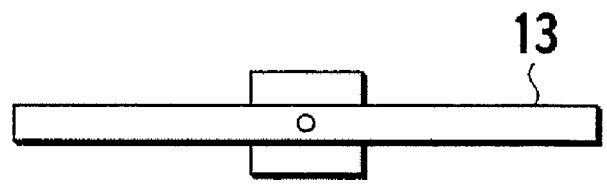
(b)
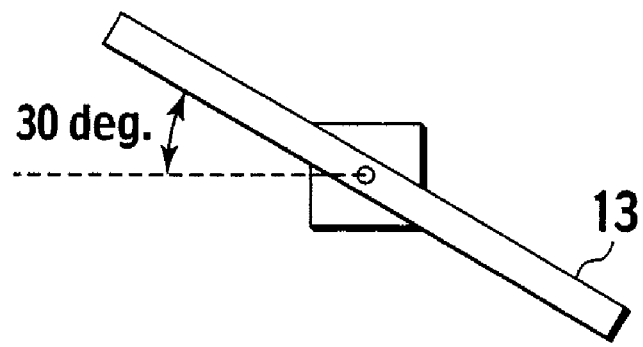
(c)
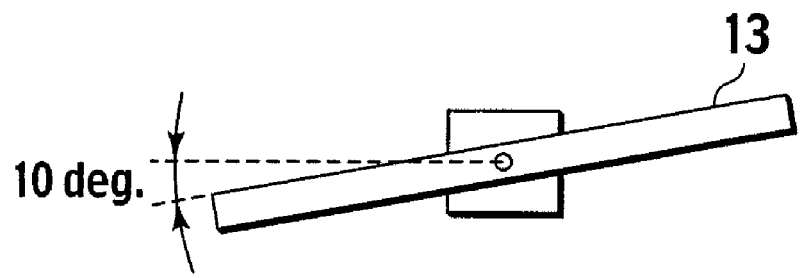

FIG. 16
(a) 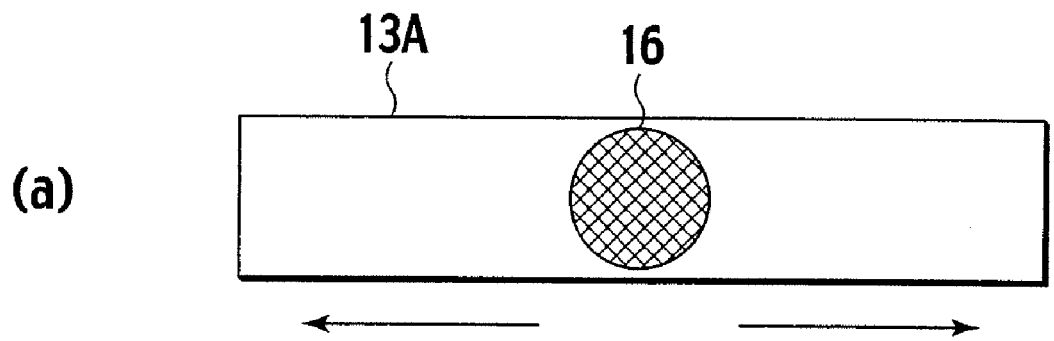
(b) 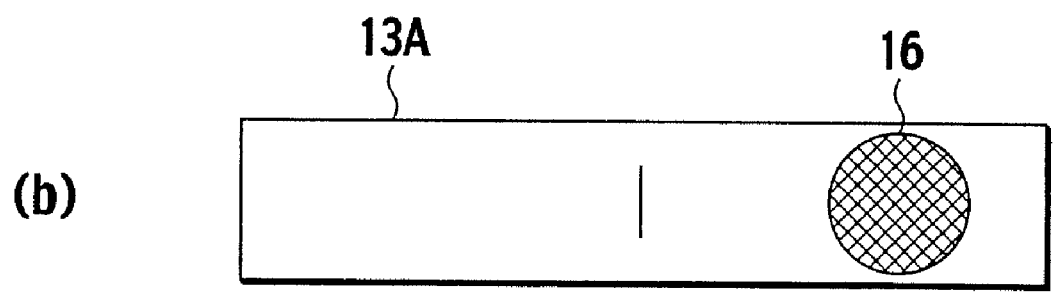
(c) 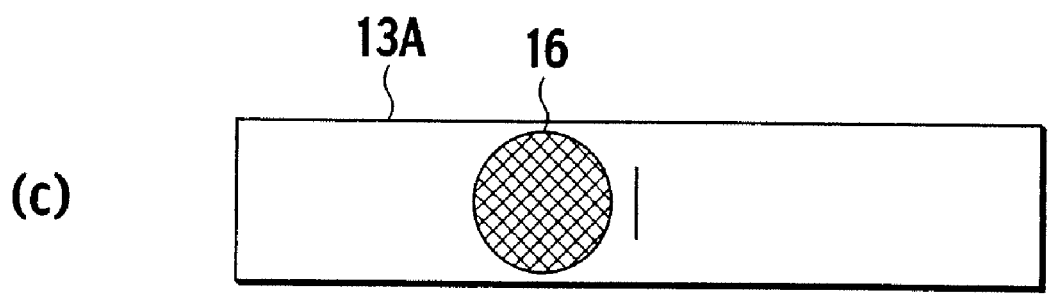

FIG. 19
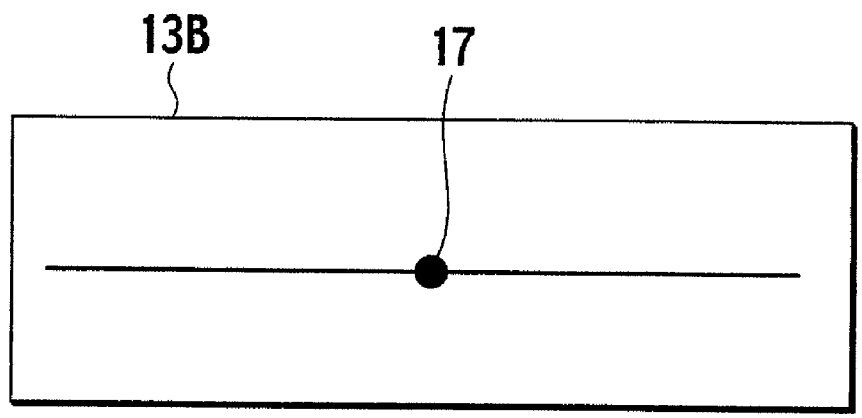
(a)
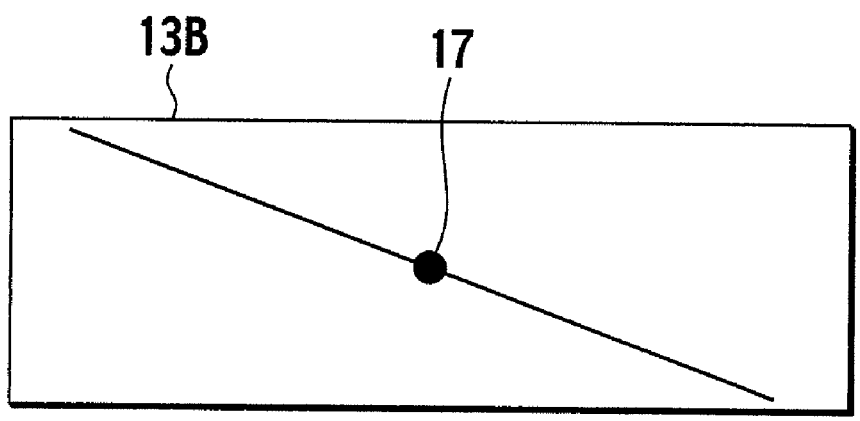
(b)
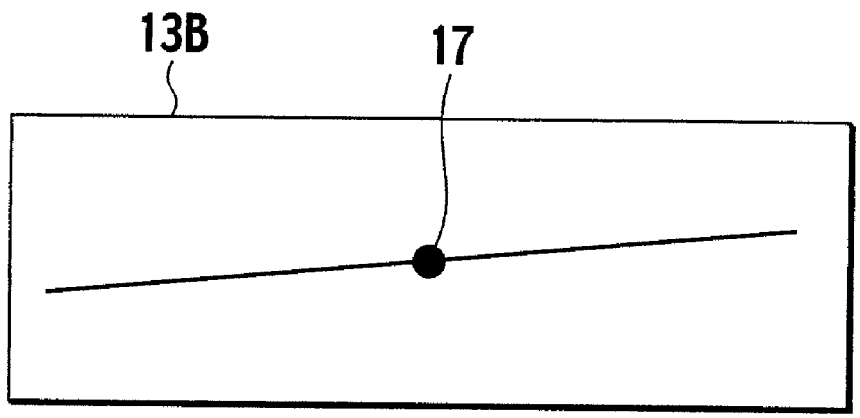
(c)

STEERING GUIDE DEVICE AND STEERING GUIDE METHOD

FIELD OF ART

The present invention relates to a technique for teaching a driver of a vehicle to perform an adequate steering operation.

BACKGROUND ART

There have been well known techniques where the driving posture of a driver, in particular, the behavior of the driver's head is stabilized to suppress a disorder of steering operation by the driver when a vehicle turns. For example, there is a method disclosed in patent document-1, in which a sight adjuster is arranged with a configuration that uniformly slopes down from about a central position of a vehicle toward both vehicle-transverse ends, to mask a lower end portion of a front windshield of the vehicle, thereby suppressing the tilt of a fore sight of a driver when the vehicle turns, in order to stabilize the driver's driving posture for prevention of a disorder of steering operation.

The steering operation by a driver when turning a vehicle, it is known that a difference exists between a clockwise steering speed in a right turn and a counterclockwise steering speed in a left turn. For the right-hand drive vehicle for example, the clockwise steering speed is generally greater than the counterclockwise steering speed, with a remarkable tendency if the driver has little experienced. Such being the case, a difference in a steering speed between right and left turn exists, which may cause a disorder of steering operation that the known method such as disclosed in the patent document-1 is unable to prevent.

[Patent document-1] Japanese Patent Application Laying-Open Publication No. 2005-75187

SUMMARY OF THE INVENTION

According to the present invention, a steering guide device detects clockwise and counterclockwise steering operations by a driver and teaches the driver in accordance with results of that detection to minimize a difference between clockwise and counterclockwise steering speeds in the steering operations.

Given in FIG. 7 are views of the visual information display rotating in accordance with steering angles.

Figure 8:
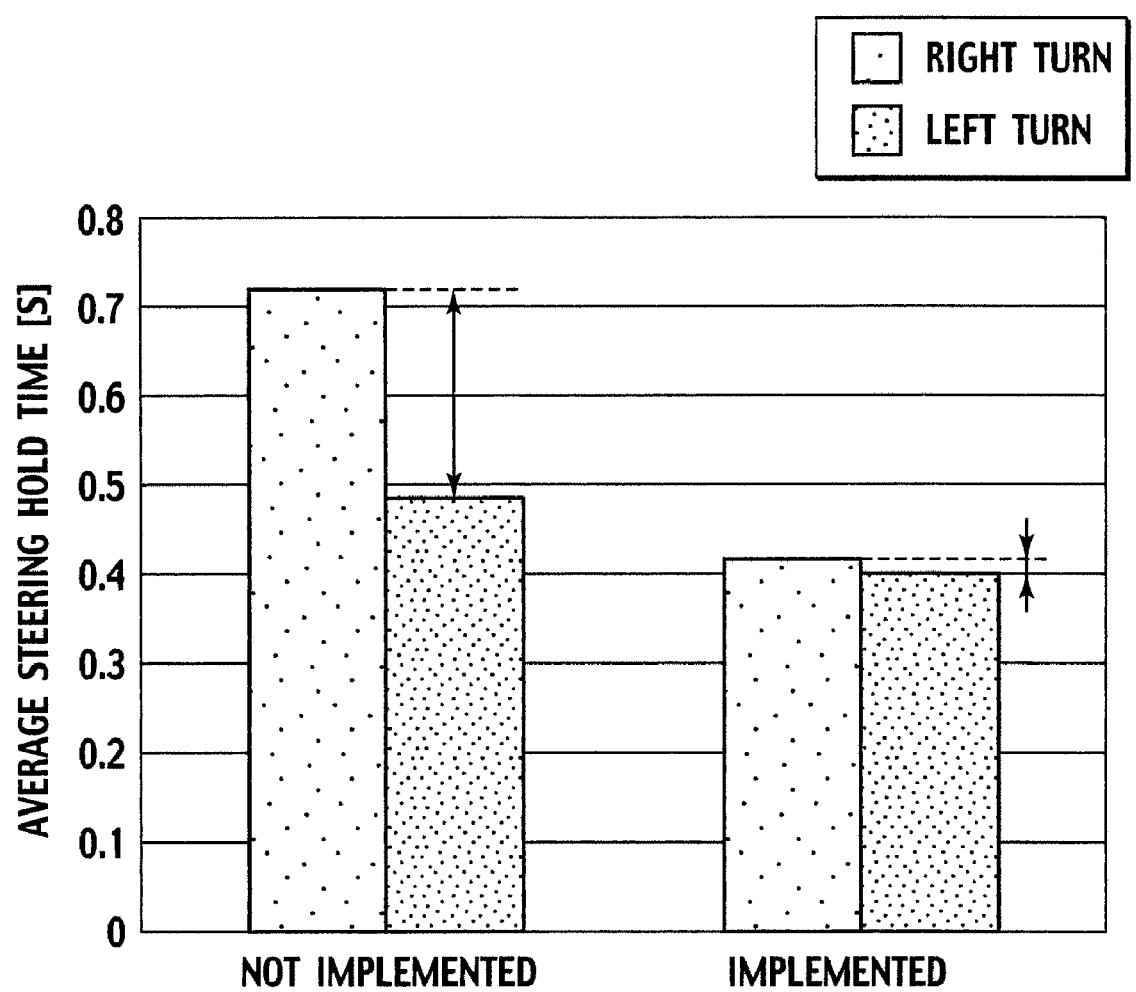

FIG. 8 is a graph showing average steering hold times changed by implementing corrections of differences between clockwise and counterclockwise steering speeds.

Figure 9:
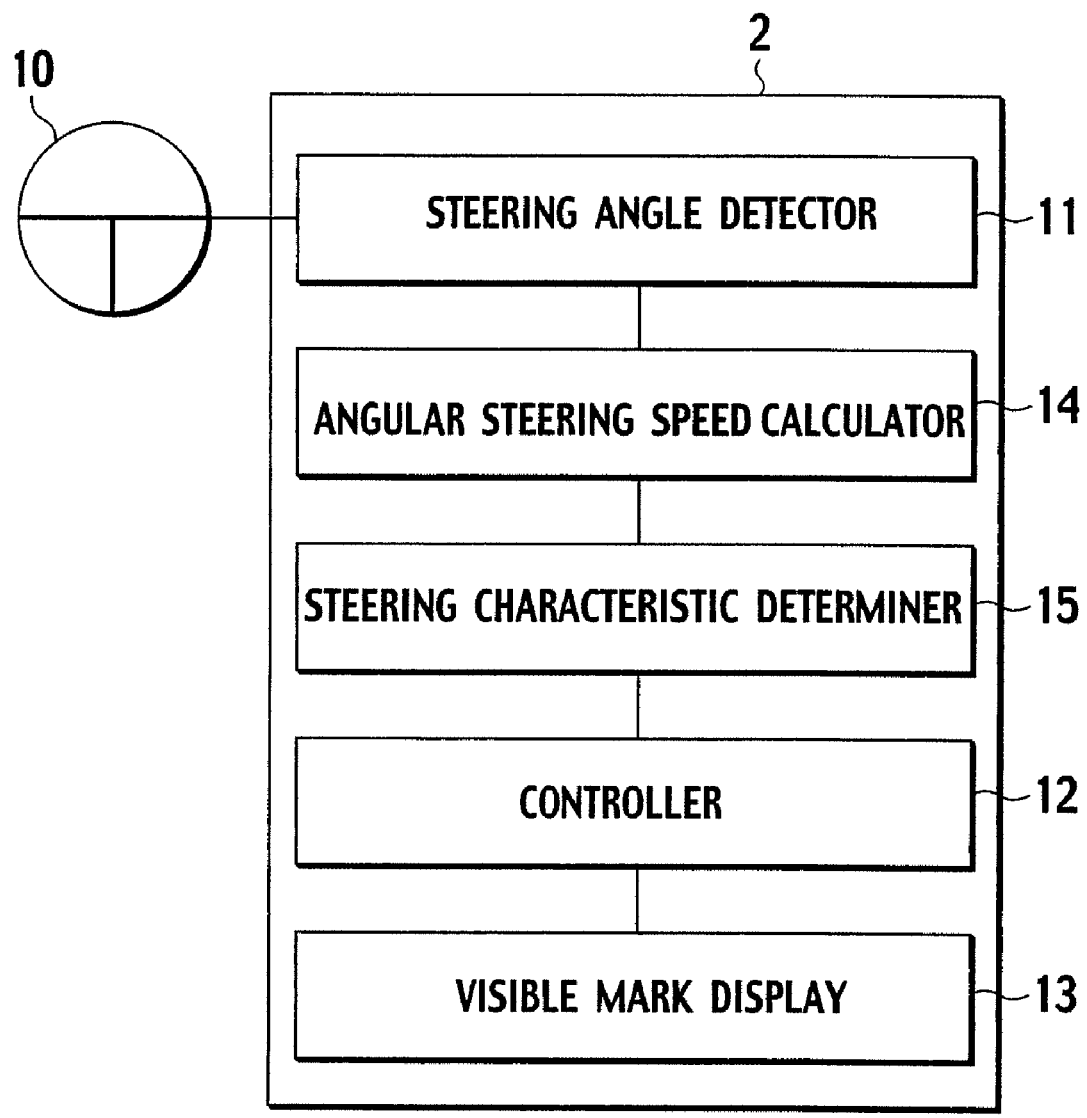

FIG. 9 is a diagram of configuration of a steering guide device according to a second embodiment.

Figure 10:
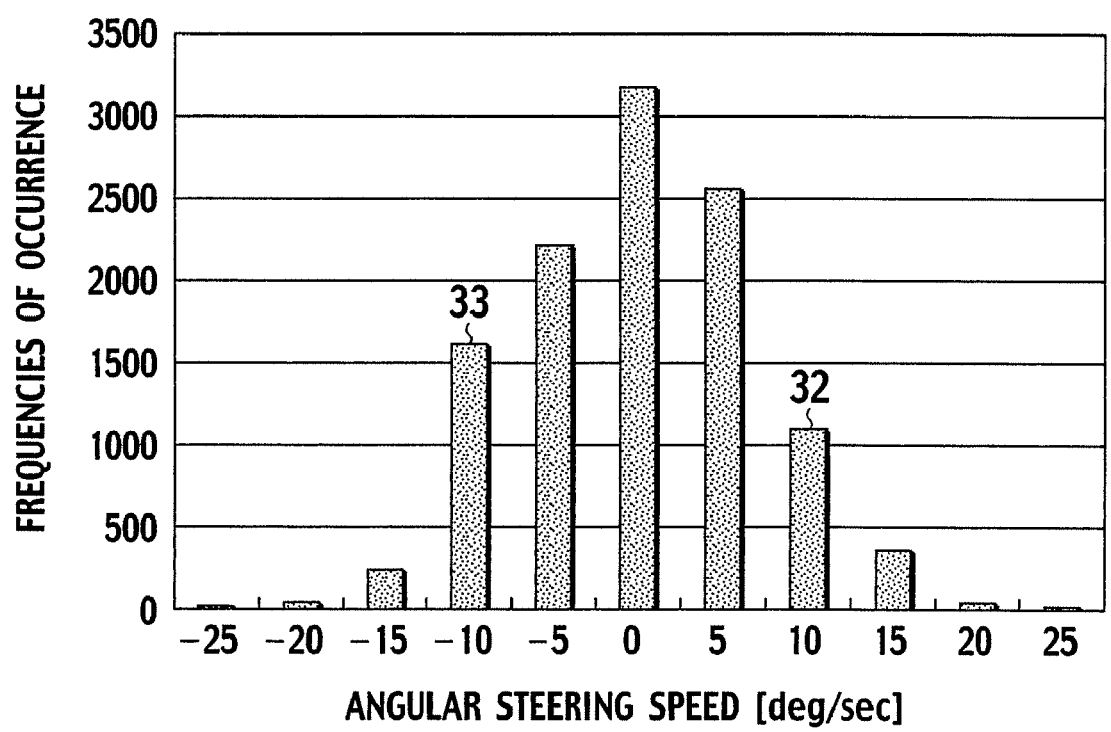

FIG. 10 is a histogram representing a distribution of frequencies of angular steering speeds sampled in every 5 deg/sec range.

Figure 11:
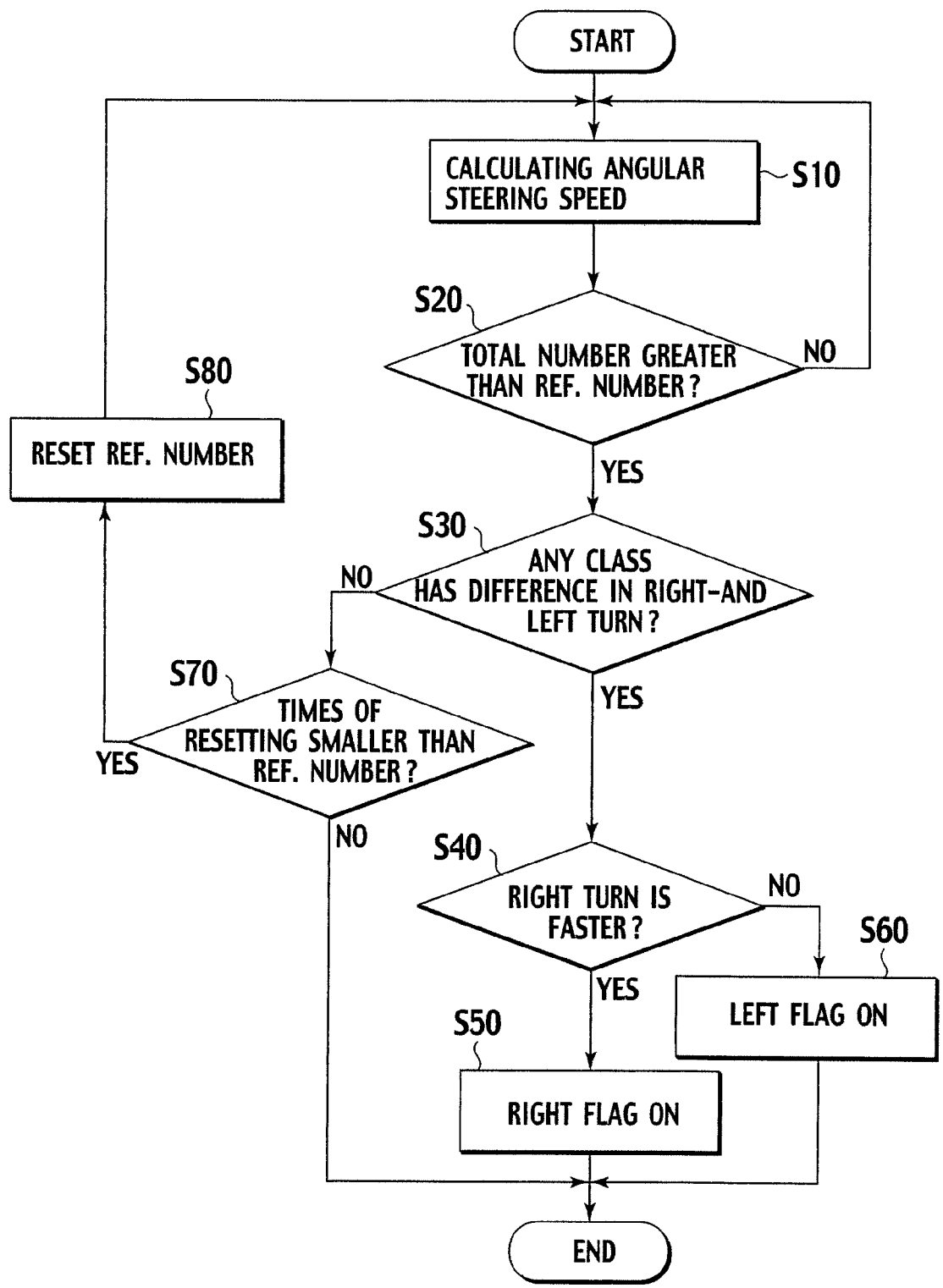

FIG. 11 is a flowchart of determining whether or not clockwise and counterclockwise angular steering speeds have a difference in between depending on a distribution of frequencies of angular steering speeds to determine steering characteristics of a driver.

Figure 12:
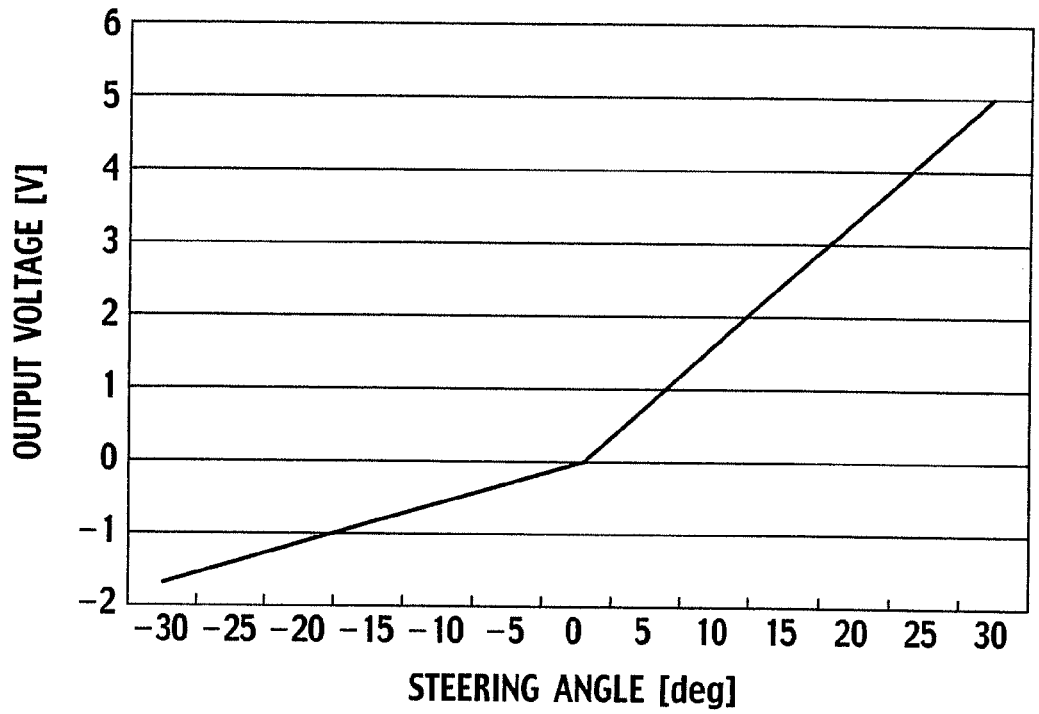

FIG. 12 is a graph showing a relationship between steering angle and output voltage after a determination for clockwise steering speeds to be faster.

Figure 13:
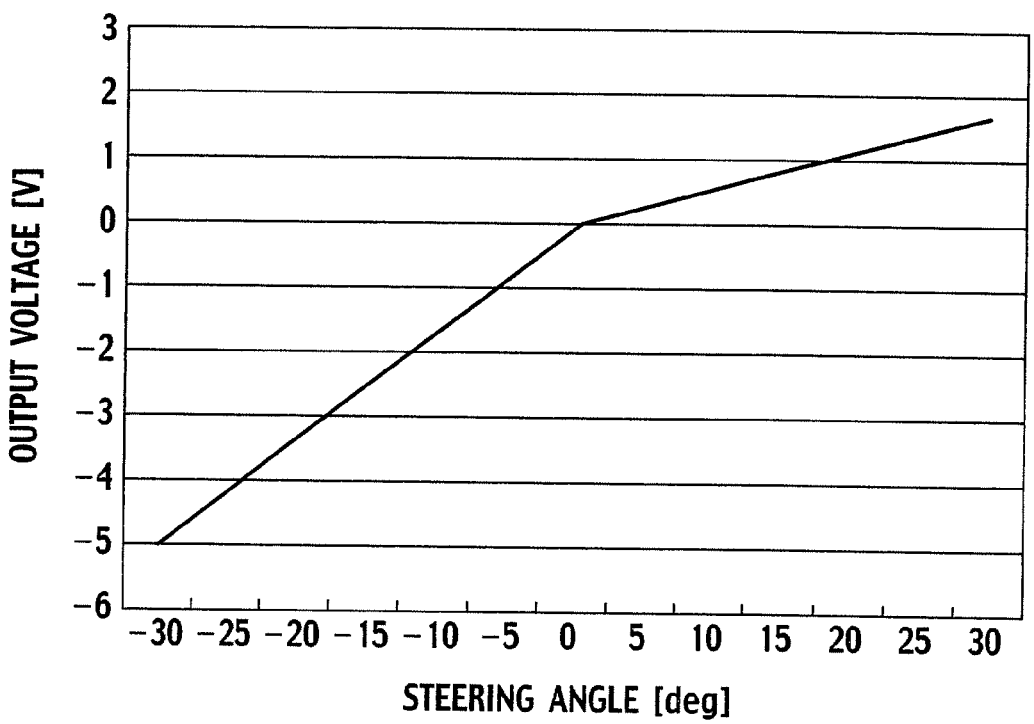

FIG. 13 is a graph showing a relationship between steering angle and output voltage after a determination for counterclockwise steering speeds to be faster.

Figure 14:
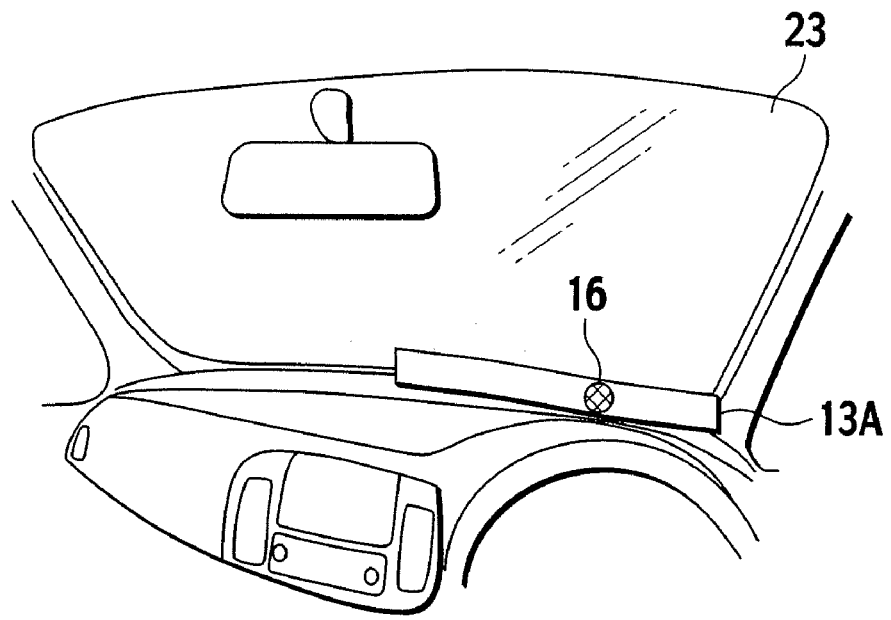

FIG. 14 is a view of an exemplary arrangement of a visual information display in a third embodiment.

Figure 15:
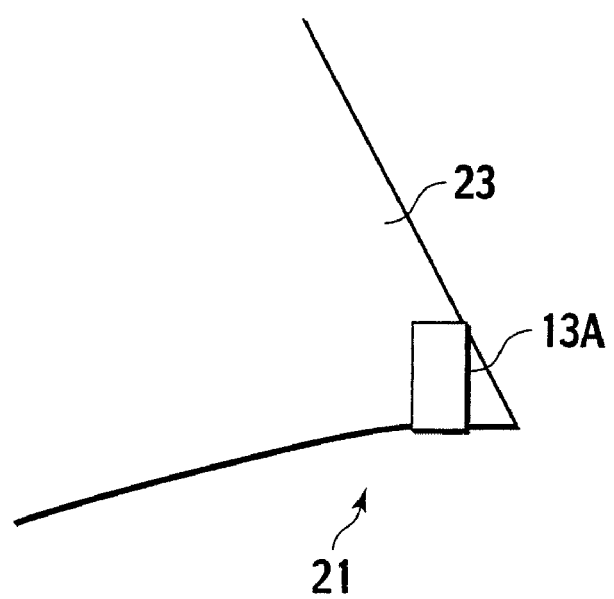

FIG. 15 is an exemplary sectional view of the visual information display in the third embodiment, as it is seen in a vehicle transverse direction.

Given in FIG. 16 are views of the visual information display with a moving member moving linearly in leftward and rightward directions in accordance with steering angles.

Figure 17:
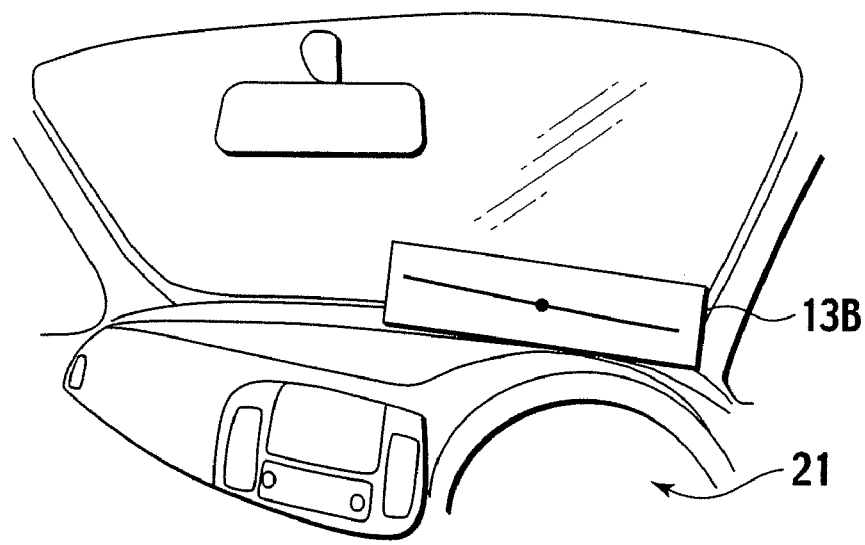

FIG. 17 is a view of an exemplary arrangement of a visual information display in a fourth embodiment.

Figure 18:
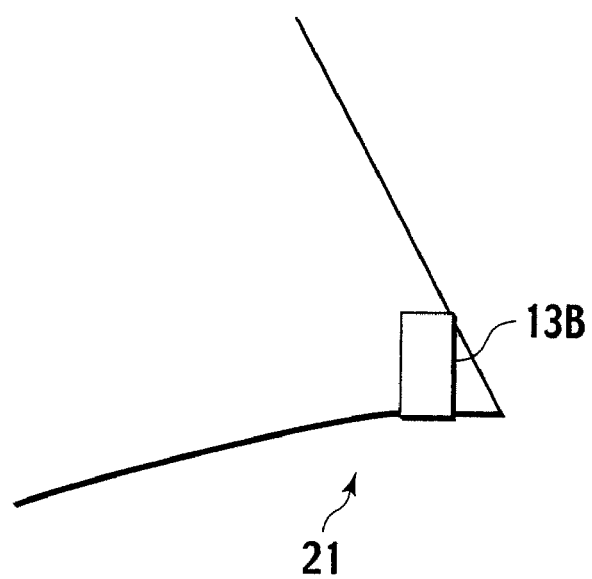

FIG. 18 is an exemplary sectional view of the visual information display in the fourth embodiment, as it is seen in a vehicle transverse direction.

Given in FIG. 19 are views of the visual information display with a graphic image rotating clockwise and counterclockwise in accordance with steering angles.

Figure 20:
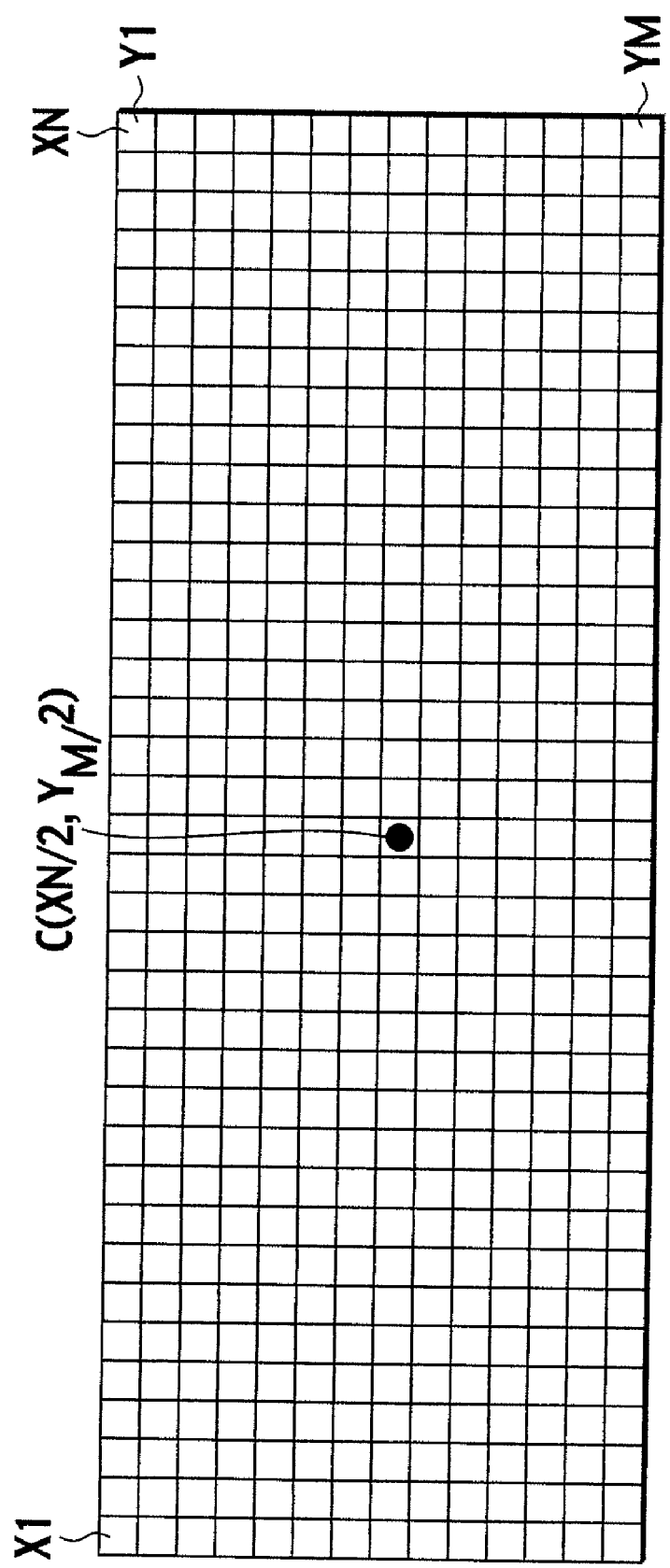

FIG. 20 is an enlarged view of an indicating display.

Figure 21:
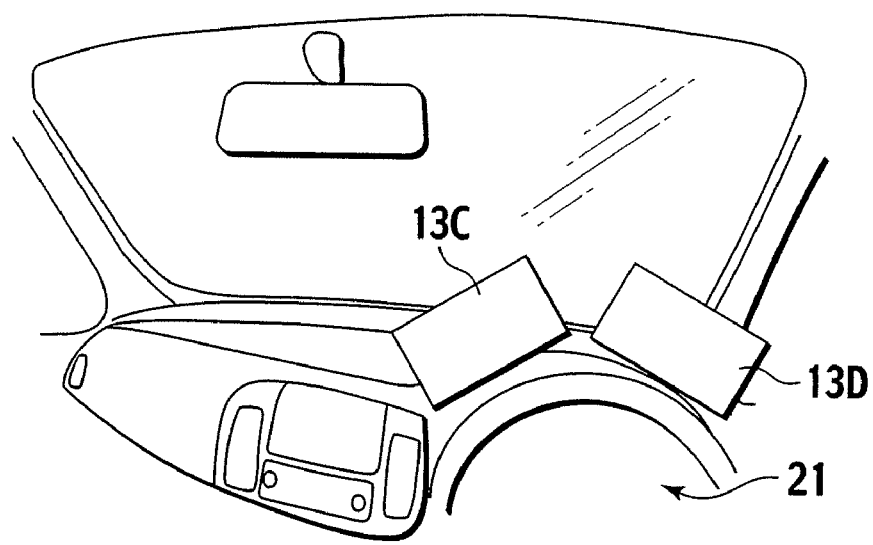

FIG. 21 is a view of an exemplary arrangement of a visual information display in a fifth embodiment.

Figure 22:
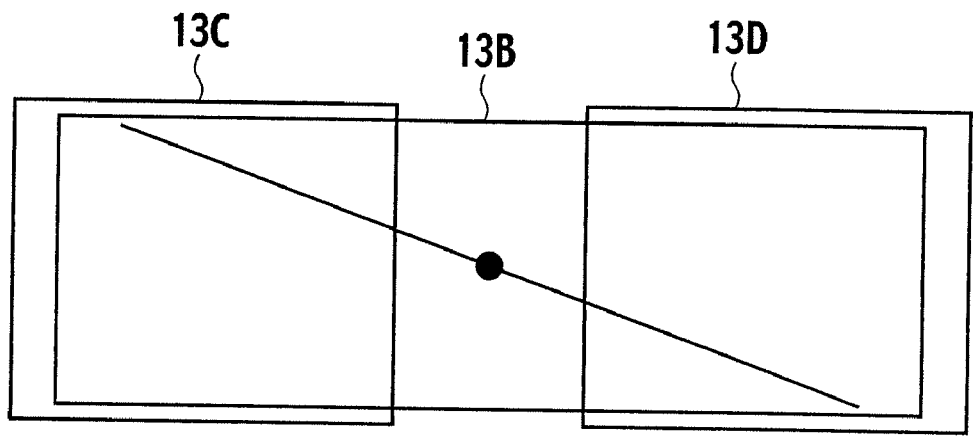

FIG. 22 is a diagram of an exemplary graphic image to be indicated in the fifth embodiment.

Figure 23:
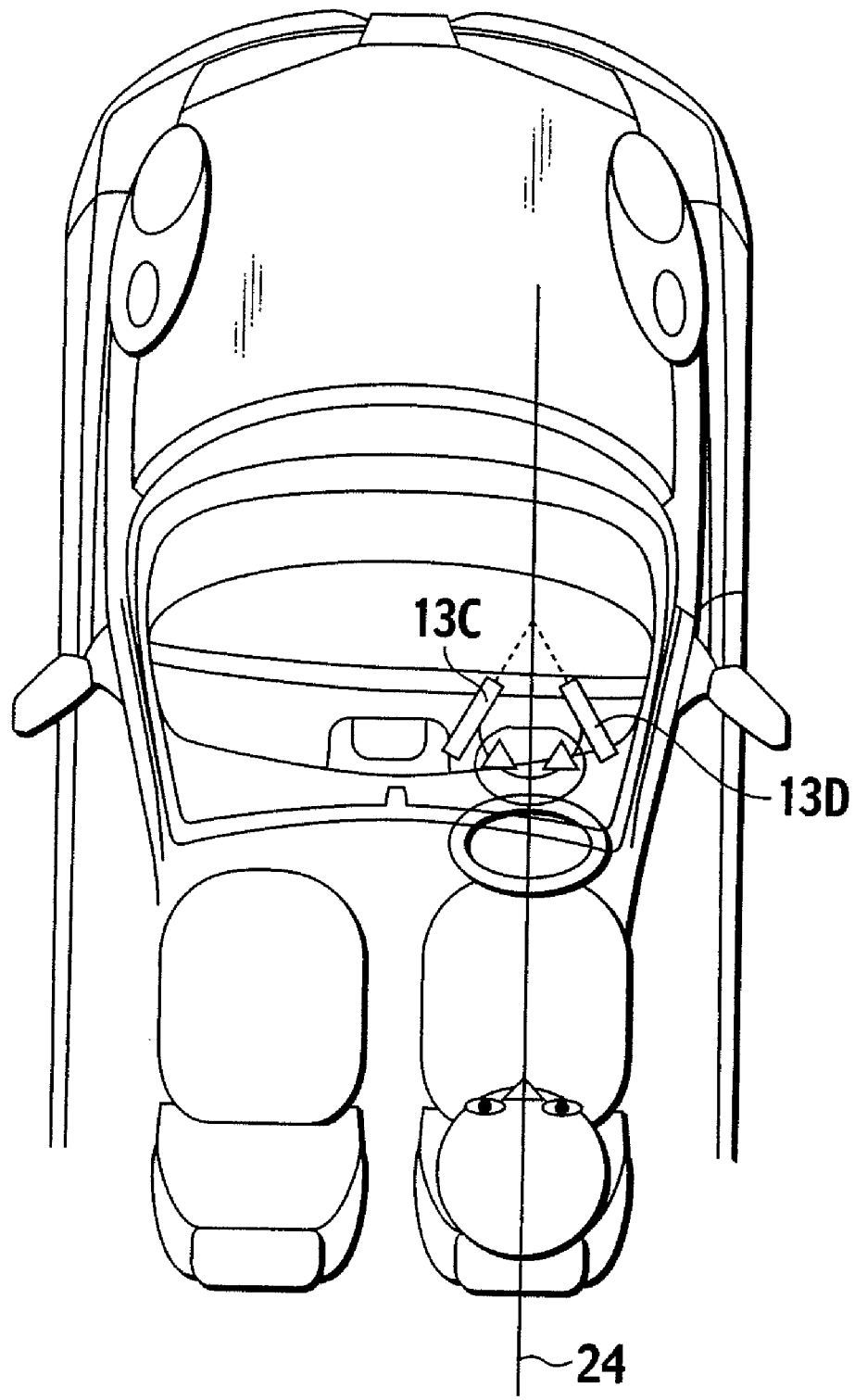

FIG. 23 is a view of arrangement of the visual information display, as it is seen in a direction from the sky.

BEST MODE FOR CARRYING OUT THE INVENTION

First Embodiment

Figure 1:
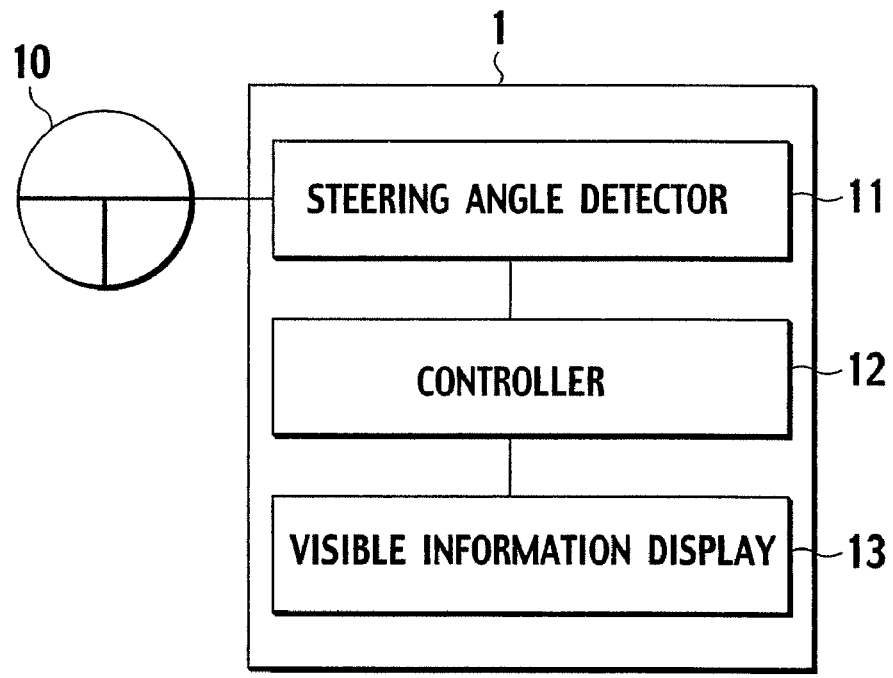
FIG. 1 is a diagram of configuration of a steering guide device according to a first embodiment.

There will be described below a steering guide device according to a first embodiment of the present invention. FIG. 1 illustrates in a diagram a configuration of the steering guide device in the first embodiment. As illustrated in FIG. 1, the steering guide device 1 is configured with a steering angle detector 11 connected to a steering wheel 10 of a vehicle, a controller 12, and a visual information display 13.

The steering angle detector 11 detects steering angles in steering operations by a driver to the steering wheel 10. The steering angle detector 11 detects steering angles based on Controller Area Network (CAN) information acquired from a CAN which builds an information and communications network in the vehicle, for example. Alternatively, it may detect steering angles based on an output voltage of an electromotive power steering-oriented motor, which is not shown in the drawing, associated with a shaft of the steering wheel 10. Other various methods for detection, may be used as a steering angle detector 11 to detect steering angles.

The controller 12 controls the visual information display 13 which turns in accordance with steering angles detected by the steering angle detector 11. For turning motion of the visual information display 13, the controller 12 includes a control circuit to regulate the output voltage in accordance with a result of steering angle detection by the steering angle detector 11, an AC servomotor operable for rotation to a rotary position commensurate with an output voltage of the control circuit.

The visual information display 13 is arranged in the vehicle within a driver's sight, and is controlled by the controller 12, to rotate in accordance with steering angles along a steering operation by the driver. For a clockwise steering operation by the driver at a right turn, the visual information display 13 turns clockwise from a reference position to positions commensurate with steering angles, and for a counterclockwise steering operation by the driver to turn the vehicle to the left, the visual information display 13 is rotated counterclockwise from the reference position to positions commensurate with steering angles. Thus, the visual information display 13 turns during a steering operation by the driver to give varied visual information to the driver, whereby a condition of the steering operation is presented to the driver. Then, a visual sense of the driver is stimulated, with an influence on the steering operation. This can be utilized as will be described to teach the driver to minimize a difference between clockwise and counterclockwise steering speeds in steering operations of the driver, for an adequate steering operation to be performed.

Figure 2:
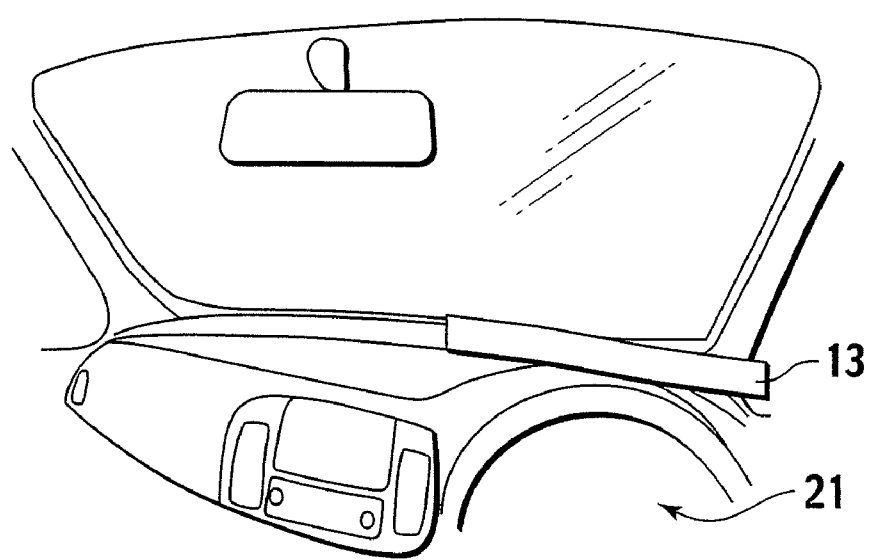
FIG. 2 is a view of an exemplary arrangement of a visual information display in the first embodiment.
Figure 3:
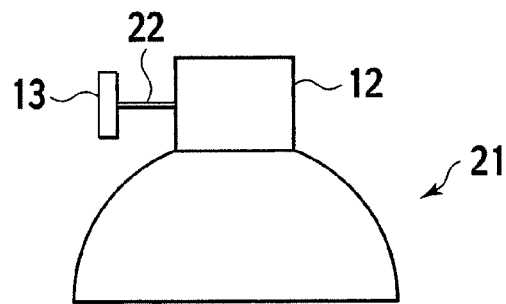
FIG. 3 is an exemplary sectional view of the visual information display in the first embodiment, as it is seen in a vehicle transverse direction.

FIG. 2 illustrates an exemplary arrangement of the visual information display 13 in the vehicle. As illustrated in FIG. 2, the visual information display 13 is arranged in the form of a rotating member with a laterally elongate form, above a speedometer 21 for example. FIG. 3 illustrates an exemplary side view of the visual information display 13, as it is seen in a perpendicular direction to a traveling direction of the vehicle, i.e., a transverse direction of the vehicle. At the top of the speedometer 21, is disposed the controller 12, from which a rotation shaft 22 protrudes toward the driver, and at its distal end, the visual information display 13 is fixed. The rotation shaft 22 is operatively connected to an AC servomotor installed inside the controller 12, so the visual information display 13 is turned about the rotation shaft 22, as the AC servomotor is operated.

It is noted that FIG. 2 and FIG. 3 illustrate merely an exemplary arrangement of the visual information display 13. Other arrangements may thus be possible as long as the visual information display 13 is arranged to remain in a sight from a driver's seat, allowing a visual sense of the driver to be stimulated by a turn of the visual information display 13 when the driver is performing a steering operation.

Incidentally, in the steering operation by a driver in a clockwise steering speed in a right turn and a counterclockwise steering speed in a left turn, generally differ from each other. For the right-hand drive vehicle for example, the clockwise steering speed generally tends to be greater than the counterclockwise steering speed, with a remarkable tendency if the driver is an inexperienced beginner.

Figure 4:
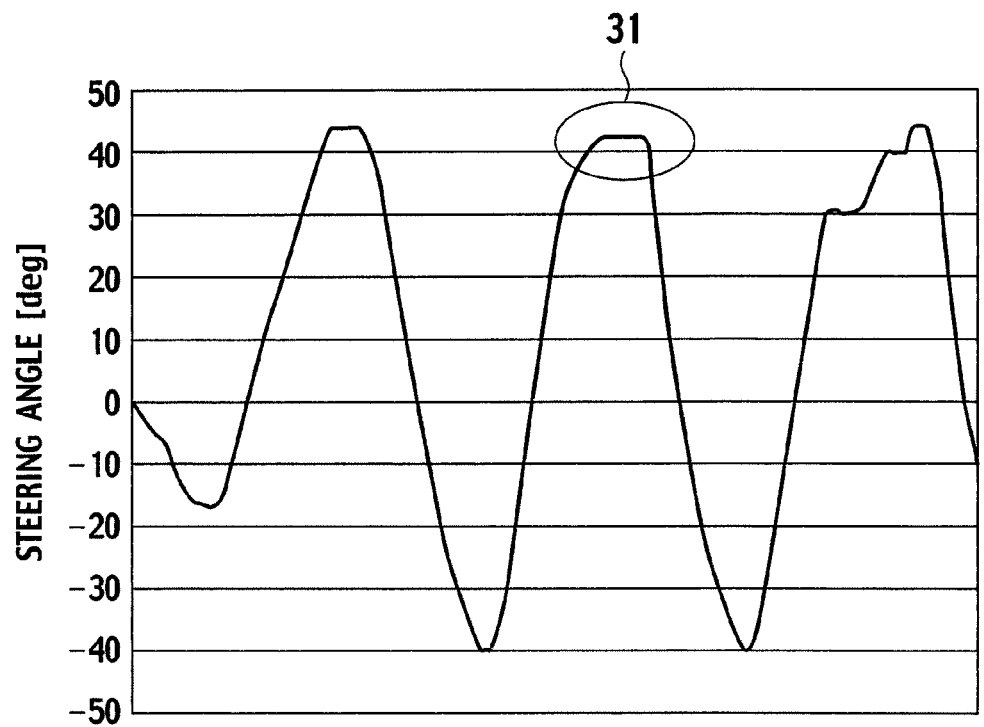
FIG. 4 is a graph showing characteristics of steering operations by a typical inexperienced driver.

FIG. 4 is a graphic representation of data on steering angles acquired as steering characteristics of an inexperienced driver in a slalom run of a vehicle on a test course. In this graph, the axis of abscissas represents a time elapsed. The axis of ordinates represents a steering angle, with positive values for clockwise steering angles with respect to a straight traveling direction, and negative values for clockwise steering angles. The running condition was a traveling by 50 km per hour through pylons at intervals of 30 m.

Figure 5:
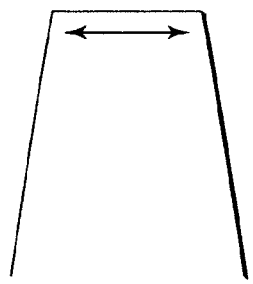
FIG. 5 is a conceptual diagram of a steering hold time in a graphic representation of data on steering angles.

In the graph of FIG. 4, designated at reference character 31 is a segment representing an interval of constant steering angle when the steering direction was changed from clockwise to counterclockwise. Such interval of constant steering angle is called "steering hold time". It will be seen from the graph of FIG. 4 that the steering hold time becomes long at segments where the steering angle turns from a rise to a fall, i.e., at a change from clockwise steering to counterclockwise steering, and that the steering hold time becomes short at segments where the steering angle turns from a fall to a rise, i.e., at a cutback from counterclockwise steering to clockwise steering. FIG. 5 illustrates a steering hold time in a conceptual diagram in a graphic representation of data on steering angles.

Such differences in steering hold time at a change of directions are developed due to different sights from a driver's seat. In other words, for the right hand drive vehicle where the right side of vehicle is better visible to a driver, the driver tends to have an increased clockwise steering angle. It is considered that, as the result, the vehicle turns to the right in a shorter time, rendering the steering hold time longer than when turning to the left. Further, with greater clockwise steering speeds than counterclockwise steering speeds, the vehicle has an increased roll rate. As a result, the driver has an unstable driving posture, leading to a disorder of steering operation.

A disorder of steering operation occurs with developed differences between clockwise and counterclockwise steering speeds in steering operations of a driver, as described above. Accordingly, the present invention detects clockwise and counterclockwise steering operations of a driver, and teaches the driver in accordance with results of that detection, to minimize a difference between clockwise and counterclockwise steering speeds in steering operations. In this respect, a specific method will be described below into details.

Figure 6:
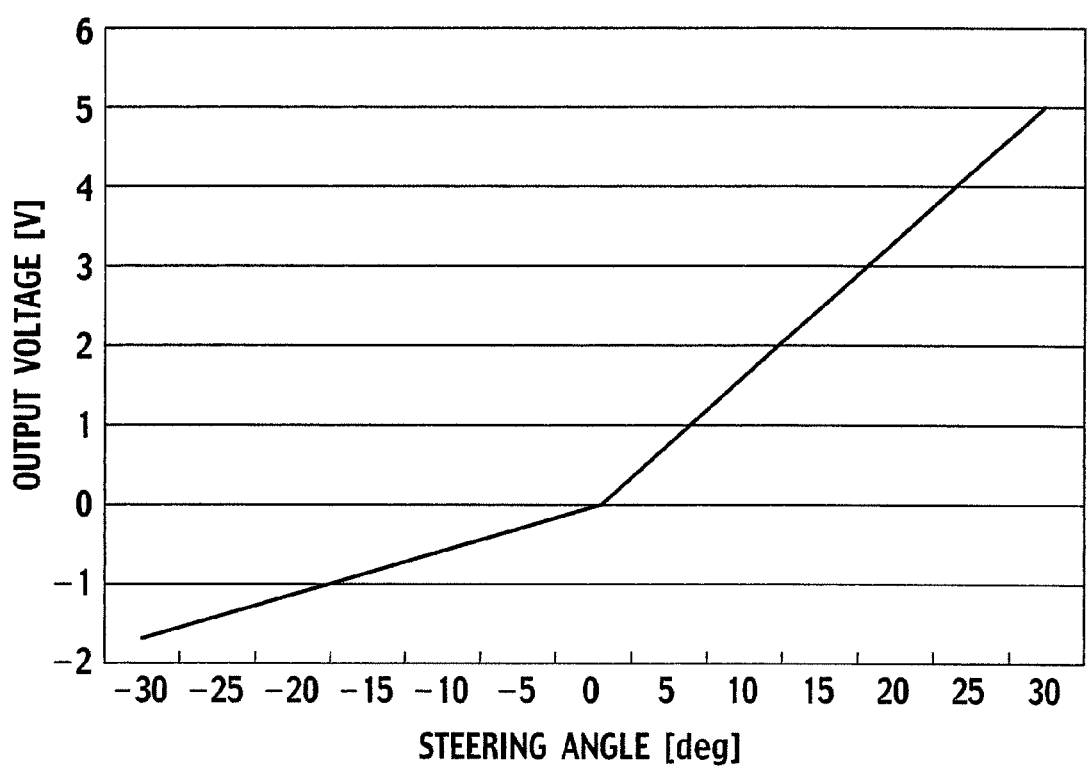
FIG. 6 is a graph representing an exemplary relationship between steering angle and output voltage.

FIG. 6 is a graph representing an exemplary relationship between a steering angle detected by the steering angle detector 11 and an output voltage from the control circuit in the controller 12 to the AC servomotor. The axis of abscissas represents the steering angle, with positive values for clockwise steering angles, and negative values for anti-clockwise steering angles. The axis of ordinates represents the output voltage. As illustrated in this graph, for clockwise steering angles, there are set higher output voltages than values to counterclockwise steering angles. For example, for a steering angle of +30 degrees, the output voltage is set to +5V, and for a steering angle of −30 degrees, the output voltage is set to −1.66V. By such settings, for identical steering angles in different directions in clockwise or counterclockwise, the AC servomotor can have set rotation angles with a difference between a value for a clockwise steering angle and a value for a counterclockwise steering angle. It is noted that for steering angles outside a range between −30 degrees and +30 degrees, the output voltages are set to constants. That is, for steering angles of +30 degrees or more, the output voltage is set to +5V, and for steering angles of −30 degrees or less, the output voltage is set to −1.66V.

Given in FIG. 7 are views of the visual information display 13 rotating in accordance with steering angles, as the AC servomotor in use is adapted to have a rotation angle of +30 degrees with an output voltage of +5 V, and a rotation angle of −30 degrees with an output voltage of −5 V. It is noted that for output voltages between −5V and 0V and between 0V and +5V, the AC servomotor has a linear varying rotation angle, while the rotation angle for 0V is set to a 0 degree.

FIG. 7(a) is an example for the steering angle of 0 degree. In this situation, it follows from the graph of FIG. 6 that with the output voltage of 0V applied to the AC servomotor, the AC servomotor has the rotation angle of 0 degree. Therefore, the visual information display 13 does not turn.

FIG. 7(b) is an example for the steering angle of +30 degrees. In this situation, it so follows from the graph of FIG. 6 that with the output voltage of +5V applied to the AC servomotor, the AC servomotor has the rotation angle of +30 degrees. Therefore, the visual information display 13 is clockwise rotated at 30 degrees.

FIG. 7(c) is an example for the steering angle of −30 degrees. In this situation, it so follows from the graph of FIG. 6 that with the output voltage of −1.66V applied to the AC servomotor, the AC servomotor has a rotation angle of −10 degrees. Therefore, the visual information display 13 tuns counterclockwise by 10 degrees.

As described above, a steering angle is detected by the steering angle detector 11 in a steering operation by a driver, and at the controller 12 sets an output voltage, based on the detected steering angle, to the AC servomotor from a relationship between steering angle and output voltage, as shown in FIG. 6. Depending on a thus set output voltage, the AC servomotor is operated for rotation, whereby a rotation angle of the visual information display 13 is set, and depending on the rotation angle, the visual information display 13 is rotated for movement. In this course, for identical steering angles in different directions being clockwise and counterclockwise, output voltages to the AC servomotor are set with a difference between a value for a clockwise steering angle and a value for a counterclockwise steering angle. By doing so, a difference is provided between a rotation amount of the visual information display 13 for the clockwise steering angle and a rotation amount of the visual information display 13 for the counterclockwise steering angle, to teach the driver to reduce a difference between clockwise and counterclockwise steering speeds in steering operations.

FIG. 8 illustrates a change in average steering hold times after implementing corrections of differences between clockwise and counterclockwise steering speeds, using the steering guide device 1 according to the present embodiment. As illustrated in this figure, it can be seen that for clockwise steering with implemented corrections, the average steering hold time is reduced by approximately one third in comparison with situations before corrections. Further, it can be seen that for counterclockwise steering as well the average steering hold time is reduced by approximately 20%. It is noted that for measurements of data in FIG. 8, the running condition was similar to that for acquisition of data on steering angles in FIG. 4.

It is noted that the relationship between steering angle and output voltage shown in FIG. 6 is set on the basis of such typical characteristics of the driver as illustrated in FIG. 4. In other words, the present embodiment is based on preset steering characteristics to teach a driver to minimize a difference between clockwise and counterclockwise steering speeds in steering operations.

For the visual information display 13, setting angles of rotation by AC servomotor as described is equivalent to setting variable amounts of visual information to be provided by the visual information display 13. Further, turning the visual information display 13 to move in accordance with the set angels is equivalent to varying visual information by the visual information display 13 in accordance with set amounts variable of the visual information. Visual information is thus changed, whereby conditions of steering operations can be presented to the driver.

According to the first embodiment described, the following functions and effects can be achieved:

(1) The steering angle detector 11 detects steering operations by the driver and a combination of the controller 12 and the visual information display 13 teaches the driver in accordance with results of that detection to minimize a difference between clockwise and counterclockwise steering speeds in steering operations. By doing so, it is possible to immunize a difference between clockwise and counterclockwise steering speeds in steering operations of the driver, thus preventing a disorder of steering operation.

(2) The driver is taught to minimize a difference between clockwise and counterclockwise steering speeds in steering operations, depending on a preset steering characteristic, without any complex processes.

(3) The driver is guided by presenting visual information on conditions of steering operations to the driver with a difference between visual information of a clockwise steering operation and visual information of a counterclockwise steering operation to a reduction of a difference between clockwise and counterclockwise steering speeds in steering operations. More specifically, the steering angle detector 11 detects steering angles in steering operations, and the controller 12 sets up variable amounts of visual information for identical steering angles in different directions being clockwise and counterclockwise, with a difference between a value for a clockwise steering angle and a value for a counterclockwise steering angle, in accordance with detected steering angles. And the visual information display 13 has the visual information vary depending on the variable amounts of visual information set to the values to be different between clockwise and counterclockwise steering angles to present conditions of steering operations to the driver, to thereby teach the driver to minimize a difference between clockwise and counterclockwise steering speeds in steering operations. By doing so, there is allowed an ensured correction of a difference between clockwise and counterclockwise steering speeds.

(4) The visual information display 13 is configured as a rotating member which is driven by rotation of the AC servomotor in the controller 12, to rotate about the rotation shaft 22 from a reference position to a position corresponding to a set rotation angle. And, the controller 12 sets up the rotation angle of the rotating member as a variable amount of visual information, and turns the rotating member of the visual information display 13 depending on the set rotation angle, thereby varying visual information By doing so, it is possible to have visual information varied with a simple configuration, for teaching the driver to minimizes a difference between clockwise and counterclockwise steering speeds in steering operations.

Second Embodiment

There will be described below a second embodiment of the present invention. In the above-described first embodiment, description is made of an example that teaches a driver to minimize a difference between clockwise and counterclockwise steering speeds in steering operations, depending on a preset steering characteristic. Instead, in the present embodiment, description is made of an example that determines steering characteristics of a driver, and teaches the driver in accordance with results of that determination, to minimize a difference between clockwise and counterclockwise steering speeds in steering operations.

FIG. 9 illustrates in a diagram a configuration of a steering guide device in the second embodiment. The steering guide device 2 illustrated in FIG. 9 includes a steering angle detector 11, a controller 12, and a visual information display 13, as described in the first embodiment, and further has an angular steering speed calculator 14 and a steering characteristic determiner 15.

The steering angle detector 11 detects steering angles in steering operations of a driver, like the first embodiment. The angular steering speed calculator 14 depends on steering angles detected by the steering angle detector 11, to determine their temporal differential values, to thereby calculate angular steering speeds. The angular steering speeds represent steering speeds in steering operations of the driver.

The steering characteristic determiner 15 determines steering characteristics of the driver depending on angular steering speeds calculated by the angular steering speed calculator 14. More specifically, it samples angular steering speeds calculated by the angular steering speed calculator 14 by a prescribed sampling period, divides results of the sampling into groups by prescribed ranges of steering angle, and adding frequencies of occurrence in each range. Results of the integration represent a history of angular steering speed, and those of a prescribed interval are stored in the steering characteristic determiner 15. Frequencies of occurrence are thus stored for each group, to obtain therefrom a histogram Depending on such a histogram, the steering characteristic determiner 15 determines whether or not clockwise and counterclockwise angular steering speeds have a difference in between, thus determining steering characteristics of the driver.

The controller 12 controls a rotary motion of the visual information display 13 in accordance with steering angles detected by the steering angle detector 11, like the first embodiment. In this situation, it changes a set value of an output voltage to an AC servomotor, depending on a result of determination on a steering characteristic of the driver by the steering characteristic determiner 15. In other words, if the determiner 15 determines that there is a difference between clockwise and counterclockwise angular steering speeds, it sets up rotation angles of the AC servomotor for each of clockwise and anticlockwise turn of an identical amount of steering angle so as to cancel the difference between a value for a clockwise steering angle and a value for a counterclockwise steering angle, in order for a possible guidance of the driver in directions to cancel out that difference. A specific method will be detailed later.

The visual information display 13 is controlled like the first embodiment by the controller 12, to rotate in accordance with a steering angle in a steering operation by the driver, thus varying visual information to the driver, to present a condition of steering operation to the driver. It thereby teaches the driver, to minimize a difference between clockwise and counterclockwise steering speeds in steering operations by the driver, in order for an adequate steering operation to be performed.

FIG. 10 is a histogram representing an exemplary distribution of frequencies of occurrence of angular steering angles obtained at the steering characteristic determiner 15. In this histogram, angular steering speeds are divided into classes by a five degree range, and their frequencies of occurrence are added to provide a frequency distribution. Designated at reference character 32 is a group representing a total of frequency of clockwise angular steering speeds in a range from 10 to 15 degrees per second. On the other hand, designated at reference character 33 is a region representing a group of a total frequency in counterclockwise angular steering speeds in a range from 10 to 15 degrees per second. By comparison between right and left corresponding total frequencies, it can be seen that the total frequency designated at reference character 33 for counterclockwise is grater than the total frequency designated at reference character 32 for clockwise. In such cases, it is determined by the steering characteristic determiner 15 that clockwise and counterclockwise angular steering speeds have a difference in between. Then, it is determined also whichever is greater between the clockwise and counterclockwise angular steering speeds. For the example in FIG. 10, it is determined that the counterclockwise angular steering speed is greater.

It is noted that for a determination in such a manner as described as to whether or not clockwise and counterclockwise angular steering speeds have a difference in between, there should be an amount of samples collected great enough to give a correct determination Therefore, no determination is made for an addition of samples of angular steering speeds equivalent or smaller in number to or than a preset value, as it is given. Further, for small differences of frequencies, e.g., 500 or less, it is preferable to determine that clockwise and counterclockwise angular steering speeds substantially have no differences in between. A difference in frequency may then be determined by proportion. For example, after a comparison between right and left corresponding addition of frequencies, if either an addition of frequency is 70% or more of the other addition of frequency, it may be determined that clockwise and counterclockwise angular steering speeds substantially have no differences in between.

Further, for such a determination, there may be a restriction to the range of angular steering speed. For example, for classes of angular steering speeds restricted within a range of 15 degrees or more (−15 degrees or less), right and left corresponding total frequencies may be compared with each other to determine, from a result of the comparison, whether or not clockwise and counterclockwise angular steering speeds have a difference in between. By dosing so, those classes free of influences from driving postures of the driver can be eliminated, to make a comparison between total frequencies of angular steering speeds, thus enabling a more exact determination of steering characteristics of the driver.

FIG. 11 provides a flowchart for the steering characteristic determiner 15 to determine whether or not clockwise and counterclockwise angular steering speeds have a difference in between depending on a histogram of frequency of angular steering speeds, to thereby determine steering characteristics of a driver, as described. Execution of this flowchart is started, such as when a shift lever of vehicle is set in a drive position, for example. At a step S10, for angular steering speeds output from the angular steering speed calculator 14, their addition are performed to prepare such a frequency histogram as illustrated in FIG. 10.

At a step S20, for a total number of samples of angular steering speeds having been added till then at the step S10, it is determined whether or not the number is equal to or greater than a preset reference value, as it is given. If the total number is equal to or greater than the reference number, the flow goes to a step S30. Unless the reference value is reached, it again goes to the step S10, for further addition of angular steering speeds to be repeated.

At the step S30, on the basis of a histogram of frequency of angular steering speeds obtained by adding samples at the step S10, right and left corresponding total frequencies are compared with each other, to thereby determine whether or not any class is found that has a difference between frequency in corresponding right and left frequency ranges. For classes having a difference between right and left, if found any, the flow goes to a step S40, but if not, it goes to a step S70. For the step S40, description will be made below in first.

At the step S40, based on a result of determination at the step S30, it is determined whether or not the clockwise steering speed is faster. If the clockwise steering speed is faster, that is, if the frequency distribution shows an increase in the total frequency at the right hand in the classes having increased angular steering speeds, the flow goes to a step S50. To the contrary, if the counterclockwise steering speed is faster, that is, if the frequency distribution has an increased frequency at the left hand for the classes having increased angular steering speeds, the flow goes to a step S60.

At the step S50, a clockwise flag is turned on to show that clockwise steering speed is faster. If the clockwise flag turned on, the controller 12 feeds to the clockwise steering angle an output voltage higher than to the counterclockwise steering angle. On the other hand, at the step S60, contrary to the step S50, a counterclockwise flag is turned to show that a counterclockwise steering speed is faster. If the counterclockwise flag turned on, the controller 12 feeds to the counterclockwise steering angle, an output voltage higher than to the clockwise steering angle. After execution of either the step S50 or the step S60, the flowchart of FIG. 11 goes to an end.

Description is now made of a flow from the step S30 to the step S70. At the step S70, it is determined whether or not the number of times when the reference number of total frequency is reset is equal to or smaller than a preset prescribed value. If the number of reset times of the reference value of total frequency is equal to or smaller than the prescribed value, the flow goes to a step S80, where the reference value is reset. The reference value that is greater than the previous one is then. After execution of the step S80, the flow again goes to the step S10 to restart addition of samples of angular steering speeds.

On the other hand, at the step S70, if the number of reset times of the reference value of total frequency is greater than the prescribed value, the flowchart in FIG. 11 goes to an end. Thus, by provision of an upper lint to the total number of frequency of angular steering speeds, it is allowed to stop entering subsequent addition, after a determination made for no differences between clockwise and counterclockwise angular steering speeds, under a condition with a sufficient number of frequency to determine a steering characteristic of the driver. It is thereby allowed to avoid entering unnecessary addition of angular steering speeds.

FIG. 12 and FIG. 13 each provide a graphic representation of an exemplary relationship between a steering angle detected by the steering angle detector 11 and an output voltage from a control circuit in the controller 12 to the AC servomotor. In those graphs, the axis of abscissas represents the steering angle, like the graph in FIG. 6, with positive values for clockwise steering angles, and negative values for counterclockwise steering angles. The axis of ordinates represents the output voltage.

FIG. 12 shows a relationship between steering angle and output voltage in which the steering characteristic determiner 15 has determined that the clockwise steering speeds is faster. In this case, like the graph in FIG. 6, for clockwise steering angles, there are set higher output voltages than to counterclockwise steering angles. For example, for a steering angle of +30 degrees, the output voltage is set to +5V, and for a steering angle of −30 degrees, the output voltage is set to −1.66V. It is noted that with the above-noted clockwise flag up, the controller 12 knows that the clockwise steering speeds is faster at the steering characteristic determiner 15.

Contrary to the case of FIG. 12, the graph in FIG. 13 shows a relationship between steering angle and output voltage in which the steering characteristic determiner 15 has determined that the counterclockwise steering speeds is faster. In this case, higher output voltages are set for counterclockwise steering angles than to clockwise steering angles. For example, for a steering angle of +30 degrees, the output voltage is set to +1.66V, and for a steering angle of −30 degrees, the output voltage is set to −5V. It is noted that with the above-noted counterclockwise flag up, the controller 12 knows that the steering characteristic determiner 15 has determined that counterclockwise steering speeds is faster.

As has been described hitherto, the steering angle detector 11 detects steering angles in steering operations by a driver, and depending on detected steering angles the angular steering speed calculator 14 calculates steering speeds in the steering operations. Then, depending on calculated steering speeds, the steering characteristic determiner 15 determines a steering characteristic of the driver. Using the result of this determination, and depending on the determined steering characteristic and detected steering angles, the controller 12 sets up an output voltage to the AC servomotor from such a relationship between steering angle and output voltage as in FIG. 12 or FIG. 13. In accordance with a thus set output voltage, the AC servomotor is driven for rotation, whereby a rotation angle of the visual information display 13 is set, and depending on the rotation angle, the visual information display 13 is rotated for movement. In this course, for identical steering angles in different directions being clockwise and counterclockwise, output voltages to the AC servomotor are set with a difference between a value for a clockwise steering angle and a value for a counterclockwise steering angle. By doing so, a difference is provided in a rotation amount of the visual information display 13 between clockwise steering angle counterclockwise steering angle to teach the driver for correction of a difference between clockwise and counterclockwise steering speeds in steering operations.

According to the second embodiment described, besides the functions and effects described in conjunction with the first embodiment, the following functions and effects can be achieved:

(1) By determining a steering characteristic of a driver, and depending on a result of the determination, teaching of the driver is performed to minimize a difference between clockwise and counterclockwise steering speeds in steering operations, thus allowing for an adequate reduction of differences between clockwise and counterclockwise steering speeds, even for a variety of steering characteristics of driver.

(2) Like the first embodiment, the driver is taught by visual information on conditions of steering operations, with a difference between visual information of a clockwise steering operation and visual information of a counterclockwise steering operation, to minimize a difference between clockwise and counterclockwise steering speeds in steering operations. More specifically, the steering angle detector 11 detects steering angles in steering operations, and depending on detected steering angles the angular steering speed calculator 14 calculates steering speeds in the steering operations. Then, depending on calculated steering speeds, the steering characteristic determiner 15 determines a steering characteristic of the driver, and in accordance with a determined steering characteristic and detected steering angles, the controller 12 sets up variable amounts of visual information for identical steering angles in different directions i.e., clockwise and counterclockwise, with a difference in value between a clockwise steering angle and a counterclockwise steering angle. And, the visual information display 13 varies the visual information depending on the variable amounts of visual information set to the values which is different between clockwise and counterclockwise steering angles to present conditions of steering operations to the driver to teach the driver to minimize a difference between clock-wise and counterclockwise steering speeds in steering operations. By doing so, there is allowed an ensured reduction of a difference between clockwise and counterclockwise steering speeds.

(3) The steering characteristic determiner 15 determines whether or not clockwise and counterclockwise steering speeds have a difference in between depending on a history of the past steering speeds, to thereby determine a steering characteristic of the driver. More specifically, angular steering speeds output from the angular steering speed calculator 14 are integrated (step S10) to prepare a distribution of total frequencies. Based on the frequency histogram, right and left corresponding frequencies are compared with each other, to determine whether or not any class is found that has a difference between right and left in pair (step S30). By doing so, it can be ensured to determine a steering characteristic of the driver by a simple processing.

Third Embodiment

There will be described below a third embodiment of the present invention. In the present embodiment, description is made of an example that presents a condition of steering operation to a driver, with visual information varied in a form different from the first and second embodiments.

FIG. 14 illustrates an exemplary arrangement of a visual information display 13A in a vehicle according to the present embodiment. Like the visual information display 13 in FIG. 2, the visual information display 13A is arranged in the vehicle, in a position within the sight of a driver. FIG. 15 illustrates an exemplary sectional view of the visual information display 13A, as it is seen in a perpendicular direction to a traveling direction of the vehicle, i.e., a transverse direction of the vehicle. It is noted that in the illustrated example that the visual information display 13A is arranged in a place between a speedometer 21 and a front windshield 23 of the vehicle. It may be otherwise arranged.

The visual information display 13A has therein a moving member 16. The moving member 16 is controlled by a controller 12, to linearly move in rightward and leftward directions relative to the center of the visual information display 13A as a reference position in accordance with a steering angle in a steering operation. There may be a mechanism in which the moving member 16 is fixed on a belt-like supporter, and the belt-like supporter is reeled in and out at both right and left ends of the visual information display 13. Then, the amount to be reeled in/reeled out may be adjusted by the controller 12 in response to the steering angle, to set a movement distance of the moving member 16 depending on the steering angle, to enable a motion of the moving member 16 linearly in rightward and leftward directions. By doing so, the moving member 16 can be linearly moved from the reference position to a position corresponding to the set movement distance, thereby giving visual information to the driver. It is noted that the moving member 16 may well be otherwise moved linearly in rightward and leftward directions.

FIG. 16 shows views of the visual information display 13A showing how the moving member 16 linearly move in rightward and leftward directions in accordance with a steering angle. FIG. 7(a) is an example of a steering angle of 0 degree. In this situation, as the movement distance is set to a 0, the moving member 16 is not displaced from the reference position which is the center of the visual information display 13A.

FIG. 16(b) is an example with a steering angle of +30 degrees. Further, FIG. 16(c) is an example with a steering angle of −30 degrees. As illustrated in those figures, for clockwise steering angles, there are set greater movement distances than values to counterclockwise steering angles. By such settings, like the first embodiment, for identical steering angles in different directions, clockwise and counterclockwise, the moving member 16 can have set movement distances corresponding to variable amounts of visual information, with a difference between a value for a clockwise steering angle and a value for a counterclockwise steering angle. By dosing so, it is allowed to teach the driver to minimize a difference between clockwise and counterclockwise steering speeds in steering operations.

It is noted that such a visual information display 13A may substitute for the visual information display 13 in the second embodiment. In other words, for a determination at the steering characteristic determiner 15 for a difference between clockwise and counterclockwise angular steering speeds, there may be set movement distances of the moving member 16 corresponding to variable amounts of visual information for identical steering angles in the clockwise and counterclockwise direction with a difference between a value for a clockwise steering angle and a value for a counterclockwise steering angle, in order to teach the driver to cancel out that difference in steering operation in either directions. By doing so, as well, it is allowed to teach the driver to minimize a difference between clockwise and counterclockwise steering speeds in steering operations.

According to the third embodiment described, the visual information display 13A has the moving member 16 linearly movable from the reference position to a position corresponding to a movement distance set by the controller 12. And the controller 12 sets up a movement distance of the moving member 16 as a variable amount of visual information, and causes the moving member 16 to move in accordance with the set movement distance, thereby varying the visual information By doing so, like the first and second embodiments, it is allowed to vary the visual information using a simple configuration, to teach the driver to minimize a difference between clockwise and counterclockwise steering speeds in steering operations.

Fourth Embodiment

There will be described below a fourth embodiment of the present invention. In the present embodiment, description is made of an example that presents a condition of steering operation to a driver, by having visual information varied in a yet another form different from the foregoing embodiments.

FIG. 17 illustrates an exemplary arrangement of a visual information display 13B according to the present embodiment in a vehicle. FIG. 18 illustrates an exemplary sectional view of the visual information display 13B as it is seen in a perpendicular direction to a traveling direction of the vehicle, i.e., a transverse direction of the vehicle. Like the visual information display 13A in FIG. 14, the visual information display 13B is arranged in the vehicle in a position with the sight of a driver, in a place between a speedometer 21 and a front windshield 23 of the vehicle. It is noted that it may be otherwise arranged.

The visual information display 13B is configured as an indicating display to indicate a graphic image in an arbitrary position on an image frame. There may be employed, e.g., a liquid crystal display, an organic EL display, etc. The graphic image to be shown on the visual information display 13B has its indication position set under control by the controller 12, depending on a steering angle in a steering operation. The graphic image is shown on the indicating display in accordance with the indication position set by the controller 12 to give visual information to the driver.

Given in FIG. 16 are views of the visual information display 13B having the graphic image of a linear form indicated thereon and rotated clockwise or counterclockwise in accordance with a steering angle. FIG. 19(a) is an example with a steering angle at 0 degree. In this situation, as the angle of rotation is set to a 0 degree, the graphic image is not rotated, and the position of indication is not changed. It is noted that a point 17 represents the center point of the indicating display. It is unnecessary to actually indicate the center point 17.

FIG. 19(*b*) is an example of a steering angle having +10 degrees. Further, FIG. 19(*c*) is an example with a steering angle at −10 degrees. As illustrated in those figures, for clockwise steering angles, there are set greater angles for rotation of the graphic image than values to counterclockwise steering angles so the indication position is greatly changed.

There will be described how to change the indication position of the graphic image having a linear form on the visual information display 13B as noted above. FIG. 20 is an enlarged view of the indicating display that constitutes the visual information display 13B. The visual information display 13B is configured as an indicating display with horizontal N dots and vertical M dots. Assuming the coordinate of a respective dot to be represented by (X(n), Y(m)), the coordinate of a dot on the center point of the image frame is represented as C=(X(N/2), Y(M/2)). It is noted that the characters n and m represent their values ranging n=1 to N, and m=1 to M.

For an indication of the graphic image to be set horizontal for the steering angle of 0 degree as in FIG. 19(*a*), those dots positioned at both ends of the graphic image have their coordinates represented such that R=(X(N), Y(M/2)) and L=(X(1), Y(M/2)), where R is a right end point and L is a left end point. Further, for an indication of the graphic image to be clockwise rotated for the steering angle of +10 degrees as in FIG. 19(*b*), the representation so follows that R=(X(N),Y(M/2-10)) and L=(X(1), Y(M/2+20)). For an indication of the graphic image to be counterclockwise rotated for the steering angle of −10 degrees as in FIG. 19(*c*), the representation so follows that R=(X(N), Y(M/2+10)) and L=(X(1), Y(M/2-10)). Thus represented coordinates of both end points and the center point are connected by straight lines to draw up graphic images to be indicated, as in FIG. 19. Further, as the coordinate displacement amounts of both ends points are set to be greater in clockwise steering than in counterclockwise steering, the graphic image is allowed to have the more greater rotation angle in clockwise steering.

It is noted that such a visual information display 13B may substitute for the visual information display 13 in the second embodiment. In other words, for a determination by the steering characteristic determiner 15 that a difference exists between clockwise and counterclockwise angular steering speeds, there may be set indication positions of the graphic image corresponding to variable amounts of visual information for identical steering angles in clockwise and counterclockwise directions with a difference between a value for a clockwise steering angle and a value for a counterclockwise steering angle, in order to teach the driver to cancel out that difference. By doing so, as well, it is allowed to teach the driver to minimize a difference between clockwise and counterclockwise steering speeds in steering operations.

The above description is addressed to an example in which the indicating display of the visual information display 13B indicates a linear graphic image, which is rotated to thereby vary visual information. The graphic image may be indicated in another way. For example, a circular graphic image may be indicated about a central region of the indicating display, and have its indication position displaced in a horizontal direction, to thereby change visual information.

Further, the indicating display of the visual information display 13B may have a brightness thereof adjusted in accordance with brightness of external light, or adjusted in dependence on the driver's operation, to thereby enable to teach the driver without losing visibility of the outside. Or the graphic image to be shown may have a changed color which enables adjustment of indication contrast, or may have an adjusted indication intensity.

The indicating display of the visual information display 13B may be about a size of 15 cm height by 25 cm width It may have any size else, as long as the size does not disturb the driver's steering operation, and allows the driver to perceive variables of the content of indication from a peripheral view by the driver.

According to the fourth embodiment described, the visual information display 13B is configured as an indicating display to indicate a graphic image in an designated position on an image frame. And the controller 12 designates an indication position of the graphic image on the indicating display as a variable amount of visual information, and causes the graphic image to be shown on the indicating display in accordance with the set indication position, thereby varying the visual information. By doing so, like the embodiments described, it is allowed to vary the visual information using a simple configuration to teach the driver to minimize a difference between clockwise and counterclockwise steering speeds in steering operations.

Fifth Embodiment

There will be described below a fifth embodiment of the present invention. In the present embodiment, description is made of an example wherein a plurality of indicating displays are arranged according to the third embodiment.

FIG. 21 illustrates an exemplary arrangement of visual information displays 13C and 13D according to the present embodiment, in a vehicle. The visual information displays 13C and 13D are each configured, like the visual information display 13B of FIG. 14 in the fourth embodiment, to indicate a graphic image in a designated position on an image frame, and may employ, e.g., a liquid crystal display, an organic EL display, or the like. If it is impossible to arrange an indicating display in such a position as illustrated in FIG. 17 due to, among others, the size or position of a speedometer 21, there may be a plurality of indicating displays arranged as in FIG. 21, and adapted for such an indication as described below, to obtain a similar effect.

FIG. 22 illustrates an exemplary graphic image to be indicated by the visual information displays 13C and 13D. Relative to such a visual information display 13B as described in the fourth embodiment, the visual information displays 13C and 13D have their indication area assigned as illustrated in the figure. Parts of the graphic image corresponding to those indication areas are indicated on the visual information displays 13C and 13D.

FIG. 23 is a view of an arrangement of the visual information displays 13C and 13D, as it is seen in a direction from the sky. In the figure, the line 24 represents a direction of the eyes of a driver. As illustrated in this figure, it is preferable to arrange the visual information displays 13C and 13D in right and left symmetric positions about the line eyes of the driver. By doing so, a resultant arrangement is easy for the driver to see.

According to the fifth embodiment described, the visual information displays 13C and 13D arranged as indicating displays in right and left symmetric positions about the eye line of the driver. And, parts of the graphic image are indicated on the indicating displays, respectively. By doing so, it is allowed to teach the driver to minimize a difference between clockwise and counterclockwise steering speeds in steering operations, even in a limited place of installation of indicating displays.

In the embodiments described, steering angle detecting means, controlling means, steering speed calculating means, steering characteristic determining means, and presenting means are implemented with a steering angle detector 11, a controller 12, an angular steering speed calculator 14, a steering characteristic determiner 15, and a visual information display 13, 13A, or 13B, or visual information displays 13C and 13D, respectively. However, the foregoing description is a consistent example, and the invention should be construed with no restrictions to or bindings on corresponding relationships between description of the foregoing embodiments and recitation in the claims.

The foregoing embodiments as well as various modifications are consistent examples, and the present invention will not be restricted by their contents, so far as characteristics features of the invention are unhindered.

INDUSTRIAL APPLICABILITY

According to the present invention, a steering guide device detects steering operations of a driver of a vehicle, and depends on a result of the detection to minimize a difference between clockwise and counterclockwise steering speeds in steering operations, thus enabling to minimize a difference between clockwise and counterclockwise steering speeds in steering operations of the driver, allowing for a prevented disorder of steering operations.

This application claims priority from Japanese Patent Application 2006-070653, filed Mar. 15, 2006, which is incorporated herein by reference in its entirety.

The invention claimed is:

1. A steering guide device comprising:
a steering angle detector configured to detect a steering angle during a steering operation;
a controller configured to set an output value based at least in part on the steering angle detected by the steering angle detector, wherein an output value magnitude set by the controller for a clockwise steering angle of a specific angle magnitude is different than an output value magnitude set by the controller for a counterclockwise steering angle of an identical specific angle magnitude; and
a visual information display configured to display visual information that varies based at least in part on the output value, thereby presenting conditions of the steering operation to a driver and enabling the driver to minimize a difference between a clockwise steering speed and a counterclockwise steering speed during the steering operation.

2. A steering guide device according to claim 1, wherein:
the visual information display comprises a rotating member configured to rotate about a rotation shaft, and
the controller is configured to set a rotation angle of the rotating member using the output value such that the rotating member rotates from a reference position to a position corresponding to the set rotation angle, thereby varying the visual information.

3. A steering guide device according to claim 1, wherein:
the visual information display comprises a moving member configured to move linearly within the visual information display, and
the controller is configured to set a movement distance of the moving member using the output value such that the moving member moves from a reference position to a position corresponding to the set movement distance, thereby varying the visual information.

4. A steering guide device according to claim 1, wherein:
the visual information display comprises at least one indicating display configured to display a graphic image on an image frame, and
the controller is configured to set a position of the graphic image using the output value such that the graphic image moves from a reference position to a position corresponding to the set position, thereby varying the visual information.

5. A steering guide device according to claim 4, wherein the at least one indicating display comprises a plurality of indicating displays, each of which is configured to display at least a portion of the graphic image.

6. A steering guide device comprising:
a steering angle detector configured to detect steering angles during a steering operation;
a steering speed calculator configured to calculate steering speeds using the steering angles detected by the steering angle detector;
a steering characteristic determiner configured to determine steering characteristics of a driver based at least in part on the steering speeds calculated by the steering speed calculator;
a controller configured to set an output value based at least in part on the steering angles detected by the steering angle detector and the steering characteristics determined by the steering characteristic determiner, wherein an output value magnitude set by the controller for a clockwise steering angle of a specific angle magnitude is different than an output value magnitude set by the controller for a counterclockwise steering angle of an identical specific angle magnitude; and
a visual information display configured to display visual information that varies based at least in part on the output value, thereby presenting conditions of the steering operation to a driver and enabling the driver to minimize a difference between a clockwise steering speed and a counterclockwise steering speed during the steering operation.

7. A steering guide device according to claim 6, wherein the steering characteristic determiner is configured to determine the steering characteristics of the driver by determining whether a difference exists between clockwise steering speeds and counterclockwise steering speeds based on a history of the steering speeds.

8. A steering guide device according to claim 6, wherein:
the visual information display comprises a rotating member configured to rotate about a rotation shaft, and
the controller is configured to set a rotation angle of the rotating member using the output value such that the rotating member rotates from a reference position to a position corresponding to the set rotation angle, thereby varying the visual information.

9. A steering guide device according to claim 6, wherein:
the visual information display comprises a moving member configured to move linearly within the visual information display, and
the controller is configured to set a movement distance of the moving member using the output value such that the moving member moves from a reference position to a position corresponding to the set movement distance, thereby varying the visual information.

10. A steering guide device according to claim 6, wherein:
the visual information display comprises at least one indicating display configured to display a graphic image on an image frame, and
the controller is configured to set a position of the graphic image using the output value such that the graphic image moves from a reference position to a position corresponding to the set position, thereby varying the visual information.

11. A steering guide device according to claim 10, wherein the at least one indicating display comprises a plurality of indicating displays, each of which is configured to display at least a portion of the graphic image.

12. A steering guide method comprising:

detecting a steering angle during a steering operation;

setting an output value based at least in part on the steering angle detected in the detecting step, wherein an output value magnitude set for a clockwise steering angle of a specific angle magnitude is different than an output value magnitude set for a counterclockwise steering angle of an identical specific angle magnitude; and displaying visual information that varies based at least in part on the output value, thereby presenting conditions of the steering operation to the driver and enabling the driver to minimize a difference between a clockwise steering speed and a counterclockwise steering speed during the steering operation.

* * * * *